US012798794B2

(12) United States Patent
Lee et al.

(10) Patent No.: US 12,798,794 B2
(45) Date of Patent: Nov. 17, 2026

(54) DROUGHT ANALYSIS METHOD USING SATELLITE IMAGERY

(71) Applicant: Republic of KOREA (National Disaster Management Research Institute), Ulsan (KR)

(72) Inventors: Jun Woo Lee, Goyang-si (KR); Dal Geun Lee, Ulsan (KR); Eun Ji Cheon, Ulsan (KR); Ha Gyu Jeong, Ulsan (KR); Jong Soo Park, Busan (KR); Dong Man Lee, Uiwang-si (KR); Su Jin Son, Ulsan (KR)

(73) Assignee: Republic of KOREA (National Disaster Management Research Institute), Ulsan (KR)

( * ) Notice: Subject to any disclaimer, the term of this patent is extended or adjusted under 35 U.S.C. 154(b) by 277 days.

(21) Appl. No.: 18/757,579

(22) Filed: Jun. 28, 2024

(65) Prior Publication Data

US 2024/0351709 A1 Oct. 24, 2024

Related U.S. Application Data

(63) Continuation of application No. PCT/KR2024/002957, filed on Mar. 7, 2024.

(30) Foreign Application Priority Data

Apr. 4, 2023 (KR) ........................ 10-2023-0044086

(51) Int. Cl.

*B64G 1/10* (2006.01)
*G06V 20/13* (2022.01)

(52) U.S. Cl.

CPC ......... *B64G 1/1042* (2023.08); *B64G 1/1028* (2023.08); *G06V 20/13* (2022.01)

(58) Field of Classification Search

CPC ..... B64G 1/1042; B64G 1/1028; G06V 20/13
See application file for complete search history.

(56) References Cited

U.S. PATENT DOCUMENTS

| | | | | |
|---|---|---|---|---|
| 2016/0171302 A1* | 6/2016 | Lavigne | G06V 20/188 382/110 |
| 2023/0245447 A1* | 8/2023 | Wang | G01C 13/002 348/144 |

FOREIGN PATENT DOCUMENTS

| | | | | |
|---|---|---|---|---|
| CA | 3206780 A1 * | 8/2022 | G06V 20/188 |
| KR | 1020110124643 A | 11/2011 | |
| KR | 101570297 B1 | 11/2015 | |
| KR | 1020180112650 A | 10/2018 | |
| KR | 20220151501 A * | 11/2022 | G06Q 50/02 |
| KR | 1020220151501 A | 11/2022 | |

* cited by examiner

*Primary Examiner* — Pinalben Patel
(74) *Attorney, Agent, or Firm* — Revolution IP, PLLC

(57) ABSTRACT

The present invention relates to a drought analysis method using satellite imagery, wherein image information received from artificial satellites and ground observation data are provided to a satellite image storage and management server, and preprocessing and drought analysis algorithms are performed within the server to analyze drought conditions in the respective area.

10 Claims, 9 Drawing Sheets

| category | example of output results |
|---|---|
| South Korea region |  |
| Average by administrative districts in South Korea |  | nationwide water surface analysis results
Display (1) - Namgang Dam Geumgangsan Dam nationwide water surface analysis results
Display (1) - Geumgangsan Dam

DROUGHT ANALYSIS METHOD USING SATELLITE IMAGERY

CROSS-REFERENCES TO RELATED APPLICATIONS

This application is a continuation of copending International Application No. PCT/KR2024/002957, filed Mar. 7, 2024, which is incorporated herein by reference in its entirety, and additionally claims priority from Korean Patent Application No. 10-2023-0044086, filed Apr. 4, 2023, which is incorporated herein by reference in its entirety.

TECHNICAL FIELD

The present invention relates to a drought analysis method based on satellite imagery data. Specifically, it pertains to a method for analyzing drought using satellite imagery, wherein water surface areas are extracted based on Modis satellite imagery to calculate the reservoir water level, thereby enabling prediction and preparation for disasters such as droughts and floods.

BACKGROUND TECHNOLOGY

Over the past 15 years, South Korea has focused on indigenizing satellite and payload technology. As satellite development technology has matured, the government is transitioning its policy from satellite development-centric to satellite information utilization-centric. Specifically, in addressing disasters and emergencies, the utility of satellite information in various disaster fields is being concretely established. Both the Korea Aerospace Research Institute and the National Meteorological Satellite Center are including disaster and emergency sectors in their satellite utilization efforts.

Recently, disasters have been showing different patterns compared to the past, becoming more complex and larger in scale. In particular, due to climate change, the variability in precipitation has increased, making it difficult to predict damage from heavy rainfall and droughts. Consequently, uncertainty is rising in the formulation of long-term disaster management plans for droughts and flood damage.

Amid increasing uncertainty in disaster management due to climate change, reservoirs, as key water resource utilization facilities, play a critical role in managing drought in our country. Approximately 18,000 reservoirs have been constructed nationwide, supplying agricultural water to about 57% of the total irrigated area and serving as essential infrastructure and means for agricultural activities.

As climate change intensifies and the uses of agricultural water diversify, the efficient use of limited agricultural water resources has become a necessity rather than a choice. Most agricultural reservoirs are small-scale, lacking adequate measuring equipment and institutional mechanisms, as well as sufficient maintenance personnel and management tasks. Furthermore, for these reservoirs, which are vital water resource facilities for both agriculture and daily life, there are no clear standards for information provision units or sufficient available data to effectively respond to disasters and emergencies.

In disaster management, it is crucial to proactively secure relevant data. To achieve this, responsible ministries and agencies are enhancing ground sensors for field data measurement and conducting nationwide management. However, due to the uneven distribution of ground sensors, there are inaccuracies in the information, particularly in areas without sensors. Although spatial correction techniques using ground sensor data are utilized to generate and utilize information, addressing the fundamental spatial limitations remains challenging.

Recently, there has been a growing demand for the design of real-time water resource monitoring systems to overcome the limitations of point-based hydrological observation data, which only holds point data, in order to promptly predict and respond to hydro-meteorological disasters. Both domestically and internationally, various attempts utilizing satellite imagery are being made in disaster management fields to overcome the spatial disadvantages of relying solely on ground sensors.

The utilization of satellite imagery allows for obtaining available information on unmeasured areas, addressing information blind spots. Additionally, it enables the production of consistent information on a nationwide scale.

DETAILED DESCRIPTION OF THE INVENTION

Technical Challenges

The present invention aims to address the problems of conventional technology by performing water surface analysis using satellite information, with the first objective being to enable the assessment of drought situations on the scale of the Korean Peninsula.

Additionally, by monitoring the water surface area of medium and small reservoirs using satellite imagery, it allows for the easy calculation of reservoir storage. Reservoir monitoring is performed in a time-series manner, and the average and standard deviation of the water surface area and reservoir storage are calculated. This aims to enable accurate analysis of the potential for drought and flood events in medium and small reservoirs as a second objective.

Furthermore, by continuously observing the water surface area of medium and small-scale agricultural reservoirs vulnerable to drought, it enables intuitive assessment of the nationwide extent of drought, serving as the third objective.

The Means to Solve the Problem

The drought analysis method using satellite imagery according to the present invention, aimed at achieving the above objectives, involves;

- wherein image information received from artificial satellites and ground observation data are provided to a satellite image storage and management server, wherein preprocessing and drought analysis algorithms are performed within the server to analyze drought conditions in the respective area;
- wherein MODIS satellite imagery is transmitted to a MODIS image processing server via a MODIS reception server,
- wherein the MODIS satellite imagery is directly received via X-band communication of a Direct Broadcast System (DBS), and wherein preprocessing at Level 0 (Raw Instrument Packets), Level 1A (Scans of raw radiances in counts), and Level 1B (Calibrated Radiances) is conducted before transmission to the satellite image storage and management server;
- wherein GPM satellite data (Integrated Multi-satellite Retrievals for GPM) other than MODIS satellite imagery and AWS data based on ground observations are transmitted to the satellite image storage and management server;

wherein temperature and precipitation data are generated based on the transmitted GPM satellite data on the server;
wherein Land Surface Temperature Mosaic (Mosaic LST) is created based on MODIS MOD11A2 satellite data transmitted to the server;
wherein Normalized Difference Vegetation Index Mosaic (Mosaic NDVI) is created based on MODIS MOD13A2 satellite data transmitted to the server;
wherein Temperature Condition Index (TCI), Vegetation Condition Index (VCI), and Precipitation Condition Index (PCI) are calculated using maximum and minimum values for each pixel over a certain period;
wherein Drought Condition Index (SDCI) is calculated based on the aforementioned TCI, VCI, and PCI;
and wherein the results of drought analysis are stored in the satellite image storage and management server.
wherein drought analysis is performed in automatic or manual mode by collecting external input data (GPM satellite data, MODIS satellite imagery, AWS data) when the preprocessing and drought analysis algorithms of the server are executed;
wherein in the automatic mode, the system periodically monitors the GPM satellite imagery path specified in the system settings and, when satellite data is generated in the server folder, performs drought analysis automatically; wherein the drought analysis results are stored in a year/month/day format in the [Drought Analysis Result Path] specified by the user based on the analysis time (date/time) information, and additional information regarding the analysis results is stored in [System Settings]-[Drought Analysis Result Storage DB].
wherein external input data (GPM satellite data, MODIS satellite imagery, AWS data) are collected to perform drought analysis in automatic or manual mode when the preprocessing and drought analysis algorithms of the server are executed;
wherein in the manual mode, drought analysis is performed based on the GPM satellite imagery path and the analysis time point (year/month/day) selected by the user, and the result is stored in the [Drought Analysis Result Path]; wherein the drought analysis result is not stored in the [Drought Analysis Result Storage DB].
wherein the drought analysis algorithm equipped in the server is MATLAB-based, utilizing MATLAB Runtime Compiler such as MCR for system operation, and DB Engine for database access along with Microsoft redistributable package for program execution.
wherein the input satellite imagery includes MODIS satellite imagery directly received from artificial satellites and GPM satellite data received online,
wherein the MODIS satellite imagery comprises MOD11A2 satellite data for land surface temperature (LST) and emissivity of MODIS (Aqua/Terra) satellites, and MOD13A2 satellite data for normalized difference vegetation index (NDVI) of MODIS (Aqua/Terra) satellites, and the GPM satellite data comprises precipitation data of GPM satellites.
wherein the directly received MODIS satellite imagery is stored in the satellite data storage of the server, and during automatic analysis, monitors the files in this storage through a polling method, automatically executing the analysis program when new satellite image data is received, storing the results, and registering the information into a catalog database.
wherein the ground observation data are collected online from Automatic Weather Stations (AWS) servers, representing daily average temperature/humidity data over a certain period in the past, based on the analysis time point.
wherein the MODIS satellite imagery undergoes preprocessing stages of Level 0 (Raw Instrument Packets), Level 1A (Scans of raw radiances in counts), and Level 1B (Calibrated Radiances) on the image processing server before being transmitted to the satellite image storage and management server, thereby obtaining images that are distinguished between water bodies and non-water bodies when outputted.
wherein the analysis results of water surface area based on satellite imagery (in Geotiff format raster data) and additional reference information (reservoir capacity, reservoir volume) are displayed to allow users to assess the extent of water surface area changes.
wherein layers are published to a GIS engine, Geoserver, for effective data management and visualization of water surface analysis results, and functionality is provided to overlay administrative boundary lines (provinces, cities/counties, districts) by default, and watershed-level common watershed maps, including major river basins, intermediate river basins, and standard watershed boundaries, can be optionally overlaid according to user selection.
wherein the National Water Resources Management Integrated Information System (WAMIS) provides information on daily dam water levels, reservoir capacity, and reservoir volume for the date corresponding to the water surface analysis history or the nearest available date, enabling comparison of dam water level and reservoir volume changes according to water surface changes, and allowing the calculation of reservoir volume using water surface area calculated from Modis satellite imagery.
wherein Monitoring of reservoir volume based on water surface area calculated from Modis satellite imagery is performed temporally, enabling the calculation of the average and standard deviation of water surface area and reservoir volume to allow for accurate analysis of drought and flood occurrence possibilities in medium and small reservoirs

The Effectiveness of the Invention

The present invention relates to a drought analysis method based on satellite imagery data, wherein the area of water surfaces is extracted using MODIS satellite images to calculate the water volume in reservoirs. This enables prediction and preparation for disasters such as droughts and floods, and facilitates understanding of drought conditions on the Korean Peninsula scale.

Furthermore, by monitoring the water surface area of medium and small reservoirs using satellite imagery, it becomes easier to calculate the water volume. Reservoir monitoring is conducted over time, allowing for the calculation of averages and standard deviations of water surface area and water volume. This enables accurate analysis of droughts and potential flooding in medium and small reservoirs.

Moreover, by continuously observing the water surface area of medium and small-scale agricultural reservoirs vulnerable to drought, it allows for intuitive assessment of the extent of nationwide drought conditions.

SIMPLE EXPLANATION OF DRAWINGS

SPECIFIC DETAILS FOR IMPLEMENTING THE INVENTION

Below, the preferred embodiments of the present invention will be described in more detail with reference to the attached drawings. However, it should be noted that the scope of the present invention is not limited to what is described here.

In this specification, the embodiments are provided to fully disclose the invention to those skilled in the art to which the invention pertains, ensuring complete enablement of the disclosure. The scope of the invention is defined solely by the claims. Therefore, in some embodiments, well-known components, operations, and techniques in the art are not explicitly described to avoid ambiguity in the interpretation of the present invention.

The terms used in this specification are intended for describing embodiments of the invention and are not intended to limit the scope of the invention in any way. In this specification, unless specifically mentioned otherwise, singular forms encompass plural forms. Additionally, components and operations referred to as "including (or, comprising)" do not exclude the presence or addition of one or more other components or operations.

The present invention pertains to a drought analysis method based on satellite imagery data, specifically using MODIS satellite images to extract water surface areas and calculate reservoir water volumes. This method enables prediction and preparation for disasters such as droughts and floods by utilizing satellite imagery for drought analysis.

Satellites observing Earth can be broadly categorized into optical (Optic) satellites and radar satellites (Synthetic Aperture Radar, SAR). Optical satellites utilize solar radiation reflected from the Earth's surface to observe it. Images acquired by optical satellites are presented in colors closely resembling reality, facilitating image recognition and analysis.

First, let's examine the specifications and characteristics of the satellites used in the present invention. The Terra and Aqua satellites are part of the Earth Observing System (EOS), operated by NASA. They orbit Earth in a sun-synchronous orbit at an altitude of 705 km, observing the entire Earth's surface daily 1-2 times (Terra: around 10:30 AM/PM, Aqua: around 1:30 PM/AM), passing over the Korean Peninsula and its surrounding airspace. MODIS (Moderate Resolution Imaging Spectroradiometer) is mounted on both Terra and Aqua satellites, serving as a versatile sensor for ocean, land, and atmospheric observations. It consists of 36 channels ranging from visible to thermal infrared, with spatial resolutions of 250 m (bands 1-2), 500 m (bands 3-7), and 1000 m (bands 8-36). Data acquired from each channel are analyzed and combined to generate information on oceanic, atmospheric, aerosol, surface conditions, and temperatures.

Figure 1:
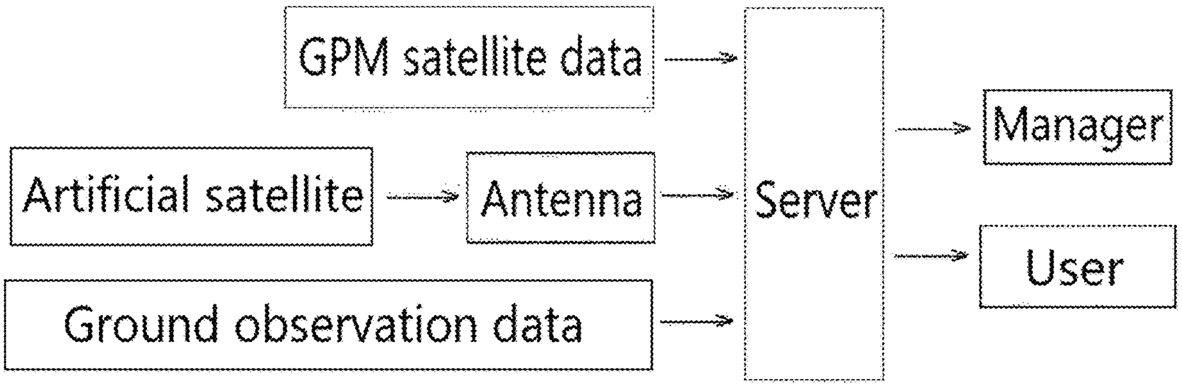
FIG. 1 is a block diagram illustrating the basic system configuration for implementing the present invention.

FIG. 1 is a block diagram illustrating the schematic configuration of the present invention, wherein the drought analysis system according to the present invention is fundamentally comprised of:

An antenna for receiving information from artificial satellites; Ground observation data provided in addition to the information directly transmitted through the antenna; Other supplementary spatial information data; A server for aggregating, processing, storing, managing, and providing the various satellite information received through the antenna, ground observation data, and other supplementary spatial information data to administrators and users.

Figure 2:
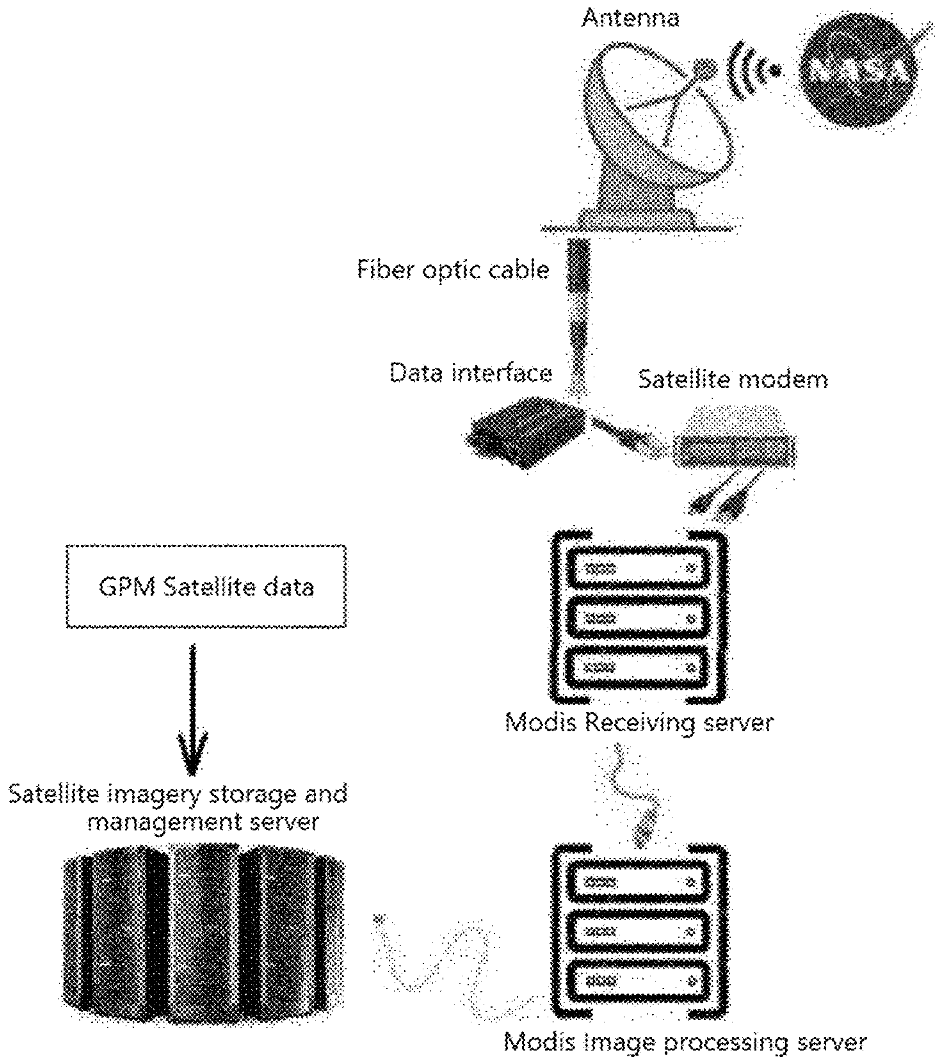
FIG. 2 is a system configuration diagram for receiving and processing various satellite information from artificial satellites.

FIG. 2 is a system configuration diagram of the drought analysis system using satellite imagery according to the present invention. The system includes:

Satellite receiving antennas; Data interfaces and satellite modems for receiving satellite information received from the antennas; Reception servers for processing the received satellite information, connected to the antennas via data interfaces and satellite modems; Image processing servers connected to the reception servers; Satellite imagery storage and management servers for aggregating, processing, storing, managing, and providing satellite information transmitted from the image processing servers to administrators and users.

The satellite receiving antenna, configured to receive MODIS imagery from NASA, can be connected as follows:

The imagery received from MODIS is connected to the data interface equipment via optical fiber cables. Subsequently, it passes through a satellite modem and is transmitted to the MODIS reception server via USB. From the MODIS reception server, the data is further transferred to the image processing server over a LAN (Local Area Network). This workflow ensures that the MODIS imagery is efficiently transmitted and processed within the system for drought analysis.

The data from the MODIS image processing server is transmitted to the satellite imagery storage and management server.

MODIS data is directly received via X-band communication in the Direct Broadcast System (DBS), and after processing stages such as Level 0 (Raw Instrument Packets), Level 1A (Scans of raw radiances in counts), Level 1B (Calibrated Radiances), it is transmitted to the satellite imagery storage and management server.

The disaster safety diverse satellite information reception and processing device according to the present invention operates centered around the FarEarth program.

The reception server verification is managed by two modules within the FarEarth system: FarEarth Acquisition and FarEarth Director. FarEarth Acquisition monitors the reception status of Landsat 8, MODIS, and VIIRS satellites. On the other hand, FarEarth Director analyzes logs and takes actions such as retransmission when necessary.

The verification of the image processing server is also conducted through the FarEarth Director module.

The verification of the satellite imagery storage and management server is performed through the FarEarth Director module and the NAS Manager module. FarEarth Director verifies the storage status of Landsat 8, Aqua MODIS, and Terra MODIS imagery, while NAS Manager manages storage usage information.

The drought analysis automation system has been developed using MODIS satellite imagery. It is built upon the existing satellite-based drought index, SDCI (Scaled Drought Condition Index). This system incorporates a drought analysis module and an automation system based on the SDCI to facilitate automated drought analysis.

Figure 3:
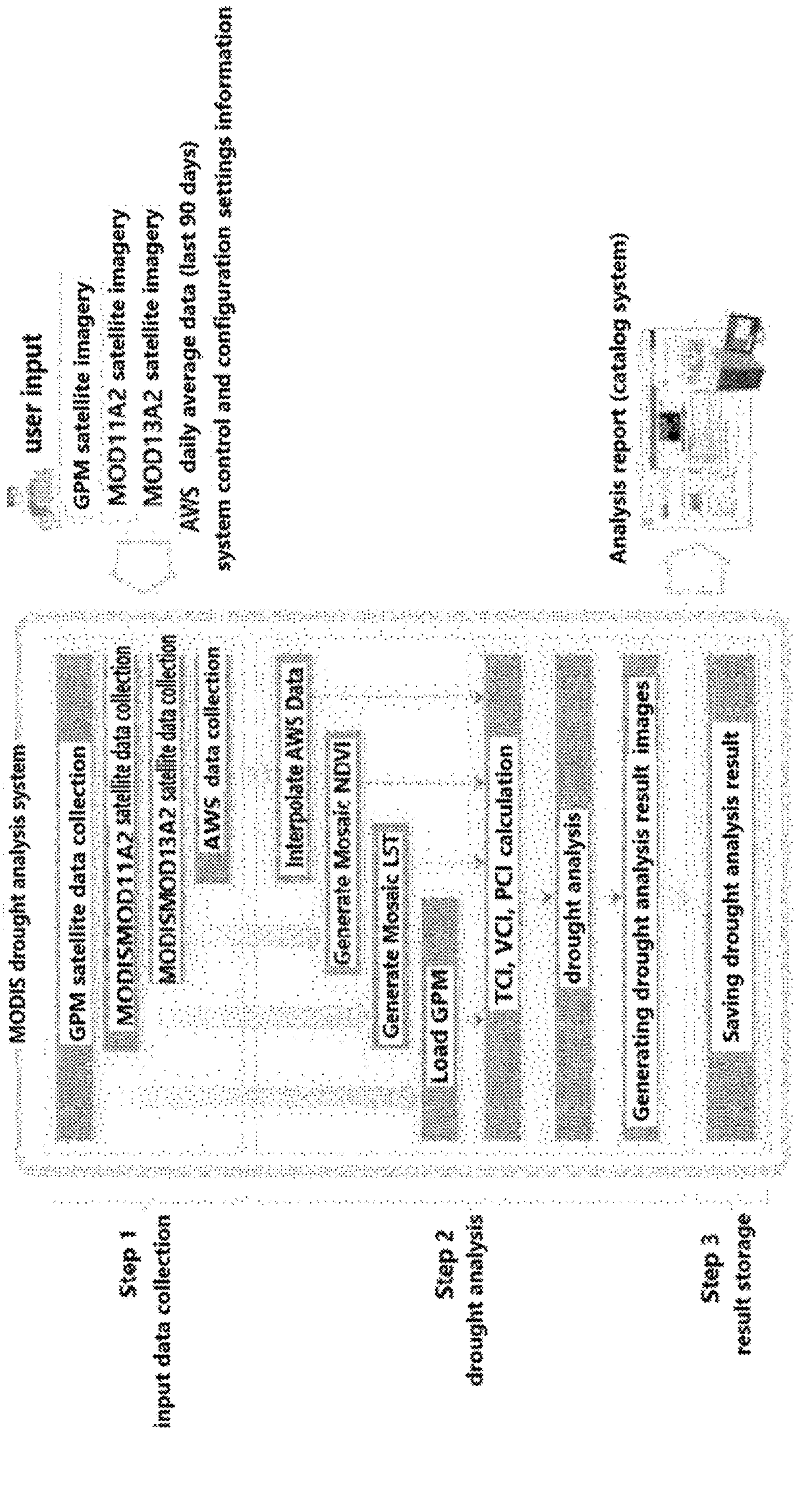
FIG. 3 is a flowchart illustrating the drought analysis method using satellite imagery according to the present invention.

FIG. 3 depicts a flowchart illustrating the drought analysis method using satellite imagery according to the present invention. It begins by receiving input data including MODIS LST (Land Surface Temperature), NDVI (Normalized Difference Vegetation Index), GPM IMERG (Integrated Multi-satellitE Retrievals for GPM), and AWS (Automatic Weather Station) temperature and precipitation data. After receiving temperature and precipitation data, the method undergoes preprocessing, computing the maximum and minimum values at each pixel over a 14-year period to derive the VCI (Vegetation Condition Index), TCI (Temperature Condition Index), and PCI (Precipitation Condition Index). Subsequently, it calculates the SDCI (Scaled Drought Condition Index). The final outputs include: 1) Satellite-based East Asia SDCI, 2) AWS-based SDCI for southern South Korea, and 3) Average AWS-based SDCI for administrative districts in southern South Korea.

The developed drought analysis automation system integrates with MODIS image reception systems and online downloaded GPM precipitation data for drought analysis primarily in the East Asia region.

For drought analysis in the Korean Peninsula, it collects meteorological observation data from the Korea Meteorological Administration (KMA) to analyze drought conditions by administrative region and across the entire Korean Peninsula.

Ultimately, it is an automated drought analysis system based on MODIS satellite imagery that can automatically analyze droughts in East Asia and the Korean Peninsula.

Figure 4:
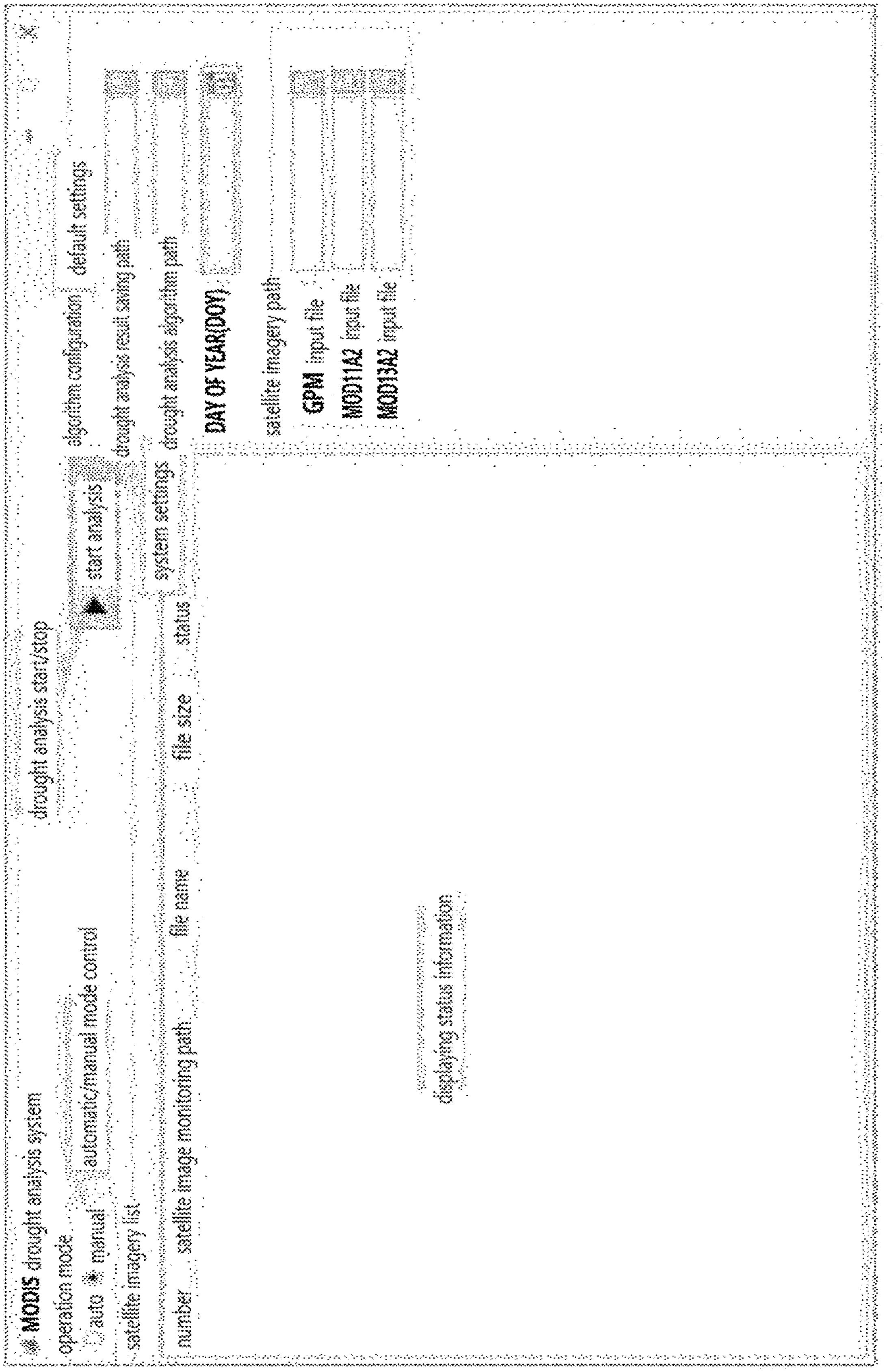
FIG. 4 is a schematic diagram illustrating the user interface layout of the drought analysis system implementing the present invention.

First, let's look at the operation methods and tools:

The MODIS drought analysis system is designed to automatically and manually analyze droughts in the Korean Peninsula and East Asia regions by collecting external input data (GPM satellite data, MODIS satellite data). The interface layout of the drought analysis system is depicted in FIG. 4.

The analysis results can be verified through the catalog system of the National Disaster Safety Research Institute.

Figure 5:
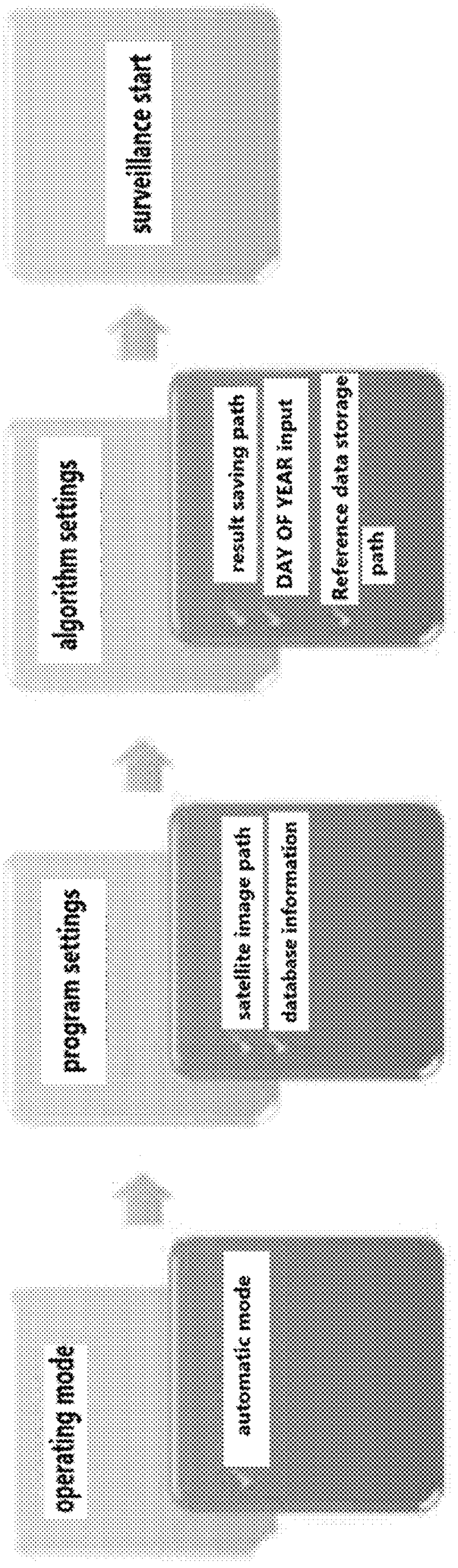
FIG. 5 is a flowchart depicting the operational flow of the automatic analysis mode of the drought analysis system according to the present invention.

FIG. 5 illustrates the operational flow of the automatic analysis mode of the drought analysis system according to the present invention. The manual analysis mode is similar to the automatic analysis mode, except that users select satellite imagery inputs used in the drought analysis algorithm and directly input the analysis criteria such as date and time to perform the analysis.

The automatic mode operates by periodically checking for newly received MODIS (Terra, Aqua) images. Upon receiving new images, it automatically performs the analysis and registers the results into the catalog system. Users can then access and review the results through the catalog web page.

Users can choose between automatic and manual modes, configuring the environment and initiating the analysis based on their selection. In automatic mode, monitoring of MODIS files begins to prepare for analysis.

Figure 6:
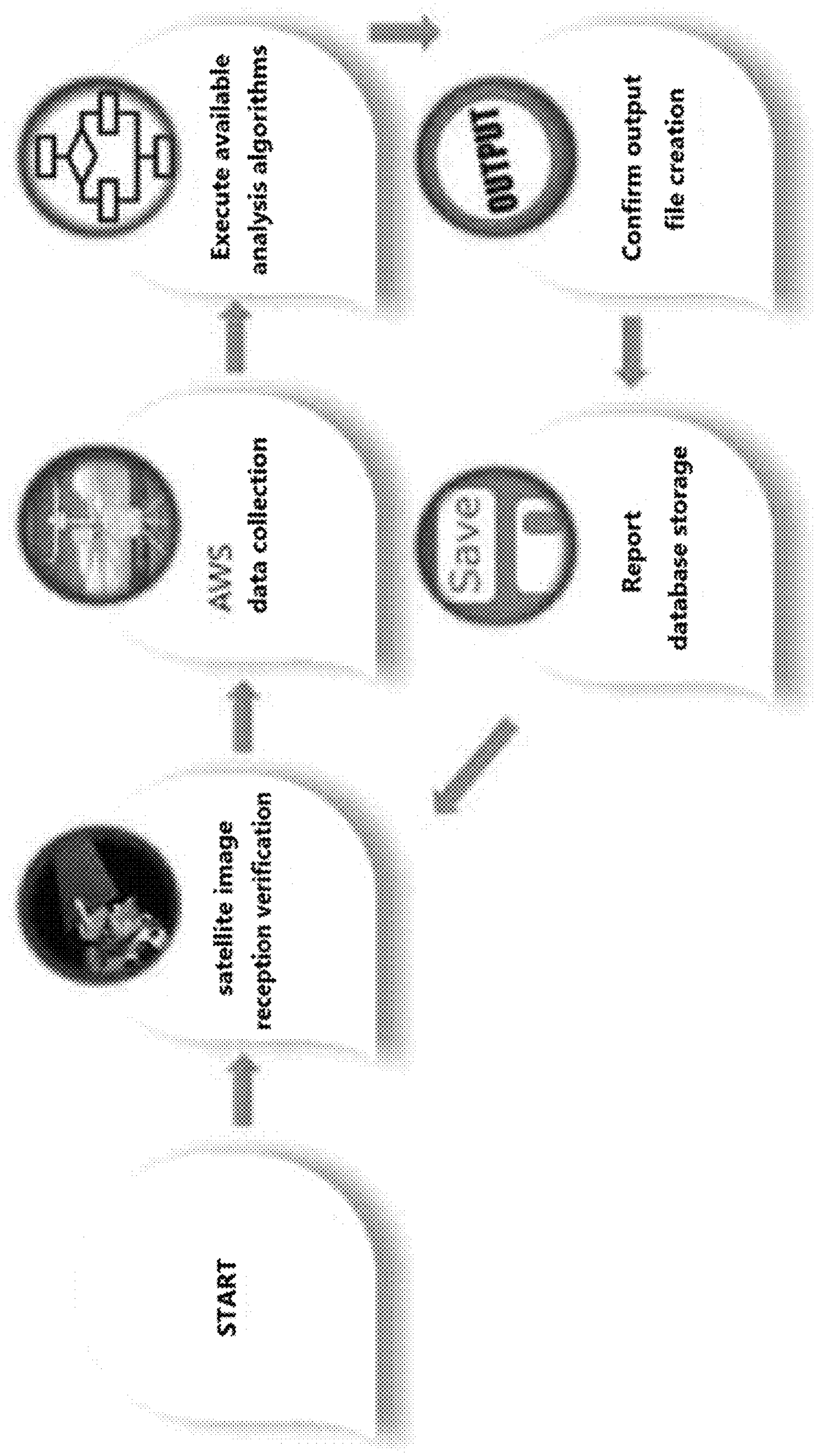
FIG. 6 is a module diagram illustrating the components of the automatic analysis mode of the drought analysis system according to the present invention.

Firstly, regarding the MODIS automatic mode, the system operates by periodically monitoring (polling) the specified GPM satellite imagery path configured in the system settings, as depicted in FIG. 6. When satellite data is generated in the designated folder, the system automatically performs drought analysis without requiring user intervention.

In this case, the drought analysis results are saved in the specified [Drought Analysis Results Path] in the format of year/month/day based on the analysis timestamp (date/time) information provided by the user. Additionally, metadata related to the analysis results is stored in [System Settings]-[Drought Analysis Results Storage DB], as referenced in FIG. 6.

Figure 7:
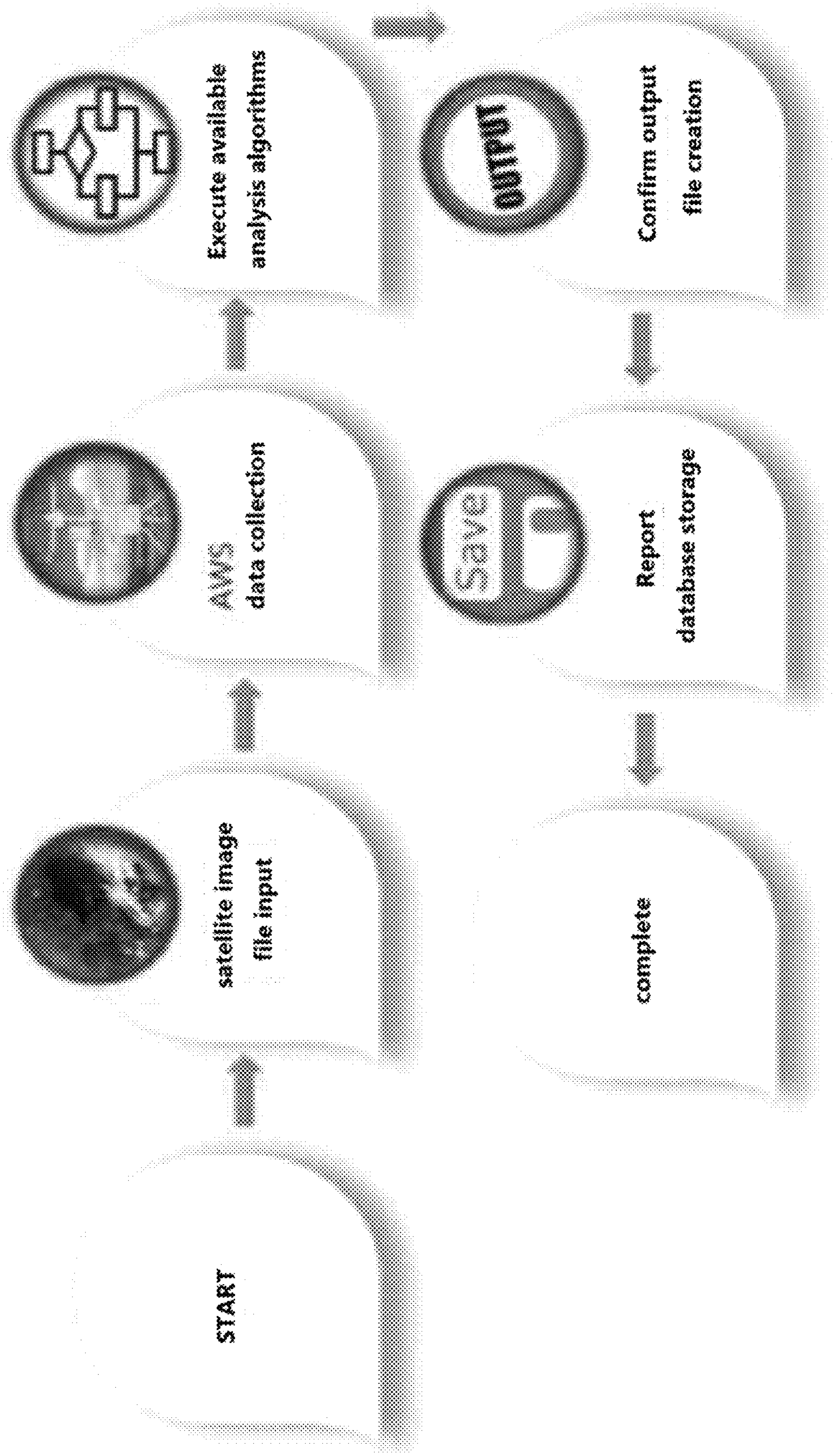
FIG. 7 is a module diagram illustrating the components of the manual analysis mode of the drought analysis system according to the present invention.

FIG. 7 is a module configuration diagram of the drought analysis system according to the present invention, illustrating the manual analysis mode for MODIS. In the MODIS manual mode, the system performs drought analysis based on the user-selected GPM satellite image path and analysis date (year/month/day), saving the results to [Drought Analysis Result Path]. In this mode, the analysis results are not stored in [Drought Analysis Result Storage DB].

Regarding the installation tools, the analysis algorithm of the MODIS drought analysis system is developed based on MATLAB. Therefore, for the system to operate, MATLAB Runtime Compiler (MCR) or an equivalent is required.

Additionally, installation of a DB Engine for database access and Microsoft redistributable packages for program execution is required. The necessary list is summarized as shown in the table below.

TABLE 1

| category | explanation |
|---|---|
| MCR | MATLAB Runtime library 2015a 64 bits |
| DE Engine | DB Access Engine 64 bits |
| .Net Framework 4.5 | Microsoft redistributable package |
| VC++ 2012 redistributable package | Microsoft redistributable package |
| SDCI S/W | MODIS drought analysis S/W |

To explain the input satellite images, the following three types of satellite image data are required for drought analysis through the MODIS drought analysis system: GPM, MOD11A2, and MOD13A2.

We collect GPM images online and directly receive MODIS images (MOD11A3, MOD13A2) for use. The table below shows the image information required for MODIS drought analysis.

TABLE 2

| category | explanation |
|---|---|
| GPM satellite data | Precipitation data from the GPM satellite |
| MOD11A2 satellite data | Land surface temperature and emissivity from the MODIS (Aqua/Terra) satellite |

TABLE 2-continued

| category | explanation |
|---|---|
| MOD13A2 satellite data | Vegetation index from the MODIS (Aqua/Terra) satellite |

Directly received data is stored in satellite data storage. During automatic analysis, the files in this storage are monitored using a polling method. When new satellite image data is received, the analysis program is automatically executed, the results are stored, and the information is registered in the catalog database.

Regarding the input auxiliary data, the input auxiliary data serves as supplementary analysis data for the MODIS drought analysis system. It uses the daily average temperature/humidity data collected from the AWS server for the past 90 days based on the analysis time (Table 2.13). The AWS DB server is accessed by entering the DB server address (IP), connection port (port), DB username (ID), DB access password (PW), and table name.

Figure 8:
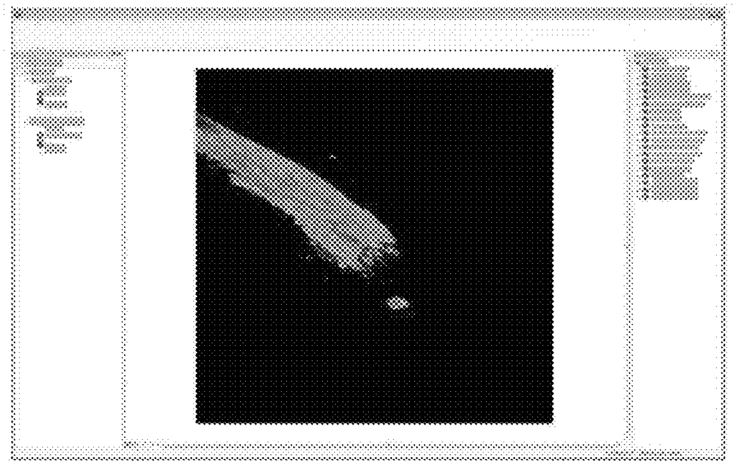
FIG. 8 is an example diagram illustrating regional segmentation-based MODIS drought analysis according to the present invention.
Figure 8:
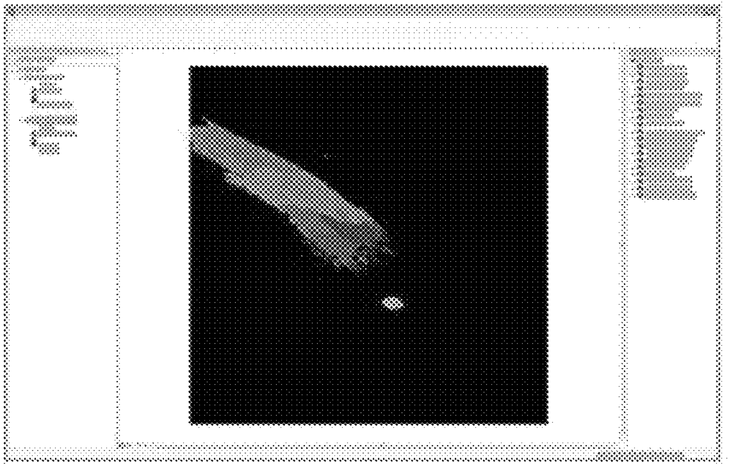

FIG. 8 illustrates an example of regional MODIS drought analysis according to the present invention. Regarding the output results, as part of the MODIS drought analysis system's output data, it has been observed that AWS server-extracted AWS data is stored in a designated folder, and drought analysis result images and files are generated for East Asia, South Korea, and administrative district-specific analyses.

The outputs of the MODIS drought analysis system are distributed internally for use within the National Disaster Safety Research Institute through the satellite image catalog system.

The results of the drought analysis system can be utilized from the early stages of drought occurrence to damage assessment. It allows estimation of precipitation, vegetation vigor, and soil moisture content even before drought onset, enabling monitoring for risk management and preparation of forecast maps for response foundation data.

During the overall analysis of drought occurrence post-incident, it is possible to monitor disaster situations. At the damage assessment stage, status reports and damage analysis can be compiled. Therefore, prior to drought occurrence, understanding the national reservoir water supply status enables the development and support of water resources in concerned regions, as well as the establishment of plans for irrigation and water conservation. Post-drought occurrence, monitoring soil moisture levels in affected areas allows for the assessment of recovery progress.

In the present invention, disaster analysis technology for droughts is advanced using MODIS satellite imagery and applied in the field. To address drought issues, continuous monitoring of water surface areas is essential. Therefore, a drought concentration monitoring algorithm using high-resolution satellites has been developed.

Furthermore, with the validation of satellite-based water surface area observations, monitoring of North Korea's large dams and reservoirs has become feasible.

Meanwhile, MODIS data is received via X-band communication of DBS (Direct Broadcast System), undergoes processing including Level 0 (Raw Instrument Packets), Level 1A (Scans of raw radiances in counts), Level 1B (Calibrated Radiances), and is then transmitted to the satellite imagery storage and management server. By directly processing this data, images distinguishing between land and water bodies can be obtained as follows.

The drought sector aims to display the results of satellite-based land surface area analysis (in Geotiff format raster data) along with additional reference information (reservoir rate, reservoir quantity), enabling users to assess changes in land surface area.

Figure 9:
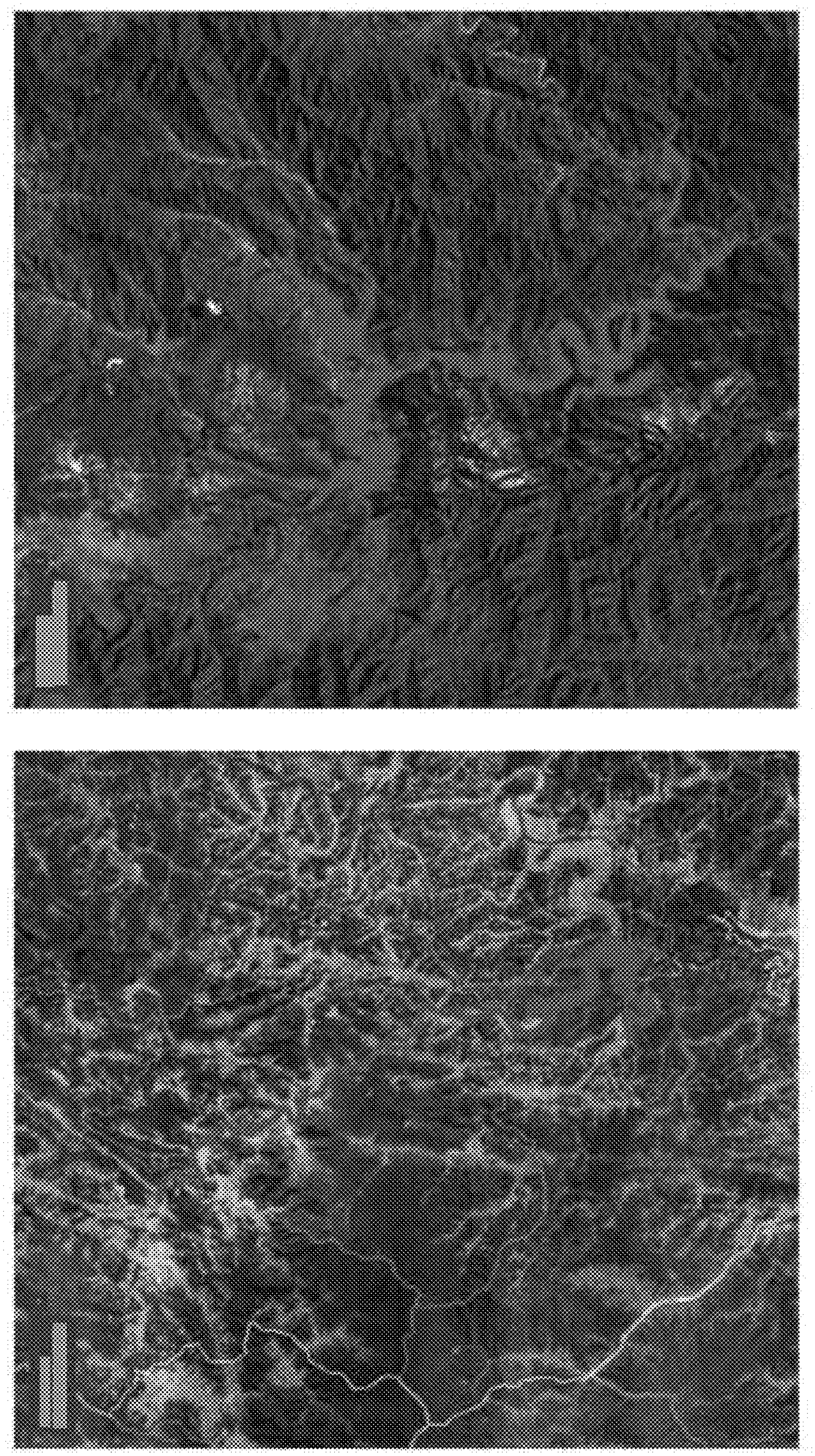
FIG. 9 is an example diagram illustrating the display of nationwide water surface analysis results according to the present invention.

FIG. 9 illustrates an example of nationwide land surface analysis results according to the present invention, showing the analysis results of land surface areas based on MODIS imagery for two national dam basins.

The main list of displayed data in the drought field is as follows, and for effective data management and visualization of land surface analysis results, the method of publishing layers on the GIS engine Geoserver has been applied. Additionally, functionality has been implemented to overlay administrative boundaries (provinces, counties, districts) by default, and watershed boundaries such as major river basins (large-scale, medium-scale, standard basins) can be overlaid together based on user selection.

TABLE 3

| Category | Content | Source |
|---|---|---|
| Drought (Water Surface) Analysis Results | Map depicting Drought (Water Surface) Analysis Results for Dam Watersheds | Analysis Results from the National Disaster Safety Research Institute |
| Dam Information | Daily Reservoir Volume, Reservoir Storage Rate, Water Level Information for Dams | National Water Resources Management Integrated Information System API |

Figure 10:
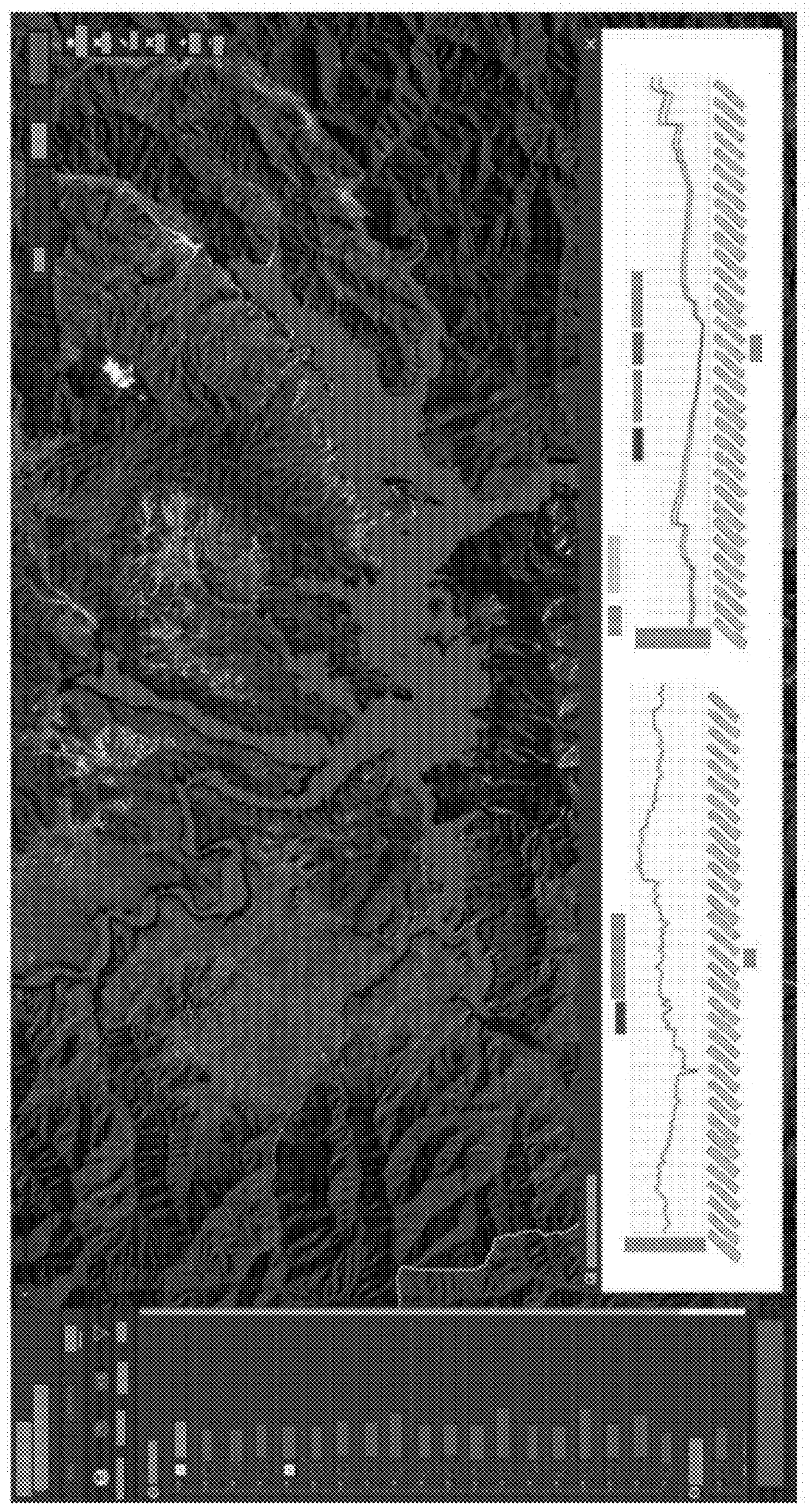
FIG. 10 is another example diagram illustrating the presentation of water surface analysis results according to the present invention.

FIG. 10 provides another example of the presentation of reservoir surface analysis results according to the present invention, where the National Water Resources Management Integrated Information System (WAMIS) provides daily water level, reservoir storage rate, and reservoir volume information for dams. It includes data from dates matching the reservoir surface analysis history or the nearest available date, allowing comparison of dam water level and reservoir volume changes with reservoir surface changes.

Therefore, by extracting reservoir surface area based on MODIS satellite imagery and calculating reservoir volume, it becomes possible to predict and prepare for disasters such as droughts and floods.

Furthermore, by monitoring the reservoir surface area of medium and small reservoirs using satellite imagery, it becomes easier to calculate reservoir volumes. Reservoir monitoring is conducted in a time-series manner, allowing for the calculation of average and standard deviation of reservoir surface area and volume. This enables accurate analysis of drought and flood potential in medium and small reservoirs.

Moreover, by continuously observing the surface area of medium and small-scale agricultural reservoirs vulnerable to drought, it allows for intuitive assessment of the nationwide extent of drought.

The technical concept of the present invention has been described in a desirable embodiment, but the embodiments mentioned are for explanation purposes and not intended to limit. It should be noted that various modifications and alterations within the scope of the technical concept of the present invention are apparent to those skilled in the art, and therefore such modifications and alterations are considered to fall within the scope of the appended claims.

What is claimed is:

1. A drought analysis method using satellite imagery, wherein image information received from artificial satellites and ground observation data are provided to a satellite image storage and management server, wherein preprocessing and drought analysis algorithms are performed within the satellite image storage and management server to analyze drought conditions in a respective area;

wherein MODIS satellite imagery is transmitted to a MODIS image processing server via a MODIS reception server, wherein the MODIS satellite imagery is directly received via X-band communication of a Direct Broadcast System (DBS), and wherein preprocessing at Level 0 (Raw Instrument Packets), Level 1A (Scans of raw radiances in counts), and Level 1B (Calibrated Radiances) is conducted before transmission to the satellite image storage and management server;

wherein the MODIS satellite imagery comprises MOD11A2 satellite data for land surface temperature, LST, and emissivity of MODIS Aqua and Terra satellites, and MOD13A2 satellite data for normalized difference vegetation index, NDVI, of the MODIS Aqua and Terra satellites;

wherein GPM satellite data (Integrated Multi-satellite Retrievals for GPM) other than the MODIS satellite imagery and AWS data based on ground observations are transmitted to the satellite image storage and management server;

wherein temperature data and precipitation data are generated based on the transmitted GPM satellite data on the satellite image storage and management server;

wherein a Land Surface Temperature Mosaic (Mosaic LST) is created based on the MOD11A2 satellite data transmitted to the satellite image storage and management server;

wherein a Normalized Difference Vegetation Index Mosaic (Mosaic NDVI) is created based on the MOD13A2 satellite data transmitted to the satellite image storage and management server;

wherein a Temperature Condition Index (TCI), a Vegetation Condition Index (VCI), and a Precipitation Condition Index (PCI) are calculated using maximum and minimum values for each pixel over a certain period, wherein the TCI is calculated using a maximum value and a minimum value of LST pixel values of the Mosaic LST for each pixel over the certain period, the VCI is calculated using a maximum value and a minimum value of NDVI pixel values of the Mosaic NDVI for each pixel over the certain period, and the PCI is calculated using a maximum value and a minimum value of precipitation pixel values of the precipitation data generated based on the transmitted GPM satellite data for each pixel over the certain period;

wherein a Drought Condition Index (SDCI) is calculated based on the aforementioned TCI, VCI, and PCI; wherein the results of drought analysis are stored in the satellite image storage and management server;

wherein analysis results of a water surface area based on the MODIS satellite imagery are displayed in Geotiff format raster data together with additional reference information comprising reservoir capacity and reservoir volume to allow users to assess the extent of water surface area changes; and wherein a National Water Resources Management Integrated Information System (WAMIS) provides information on daily dam water levels, the reservoir capacity, and the reservoir volume for a date corresponding to a water surface analysis history or the nearest available date, enabling comparison of changes in the daily dam water levels and changes in the reservoir volume according to the water surface area changes, and allowing calculation of the reservoir volume using the water surface area calculated from the MODIS satellite imagery.

2. A drought analysis method using satellite imagery of claim 1, wherein drought analysis is performed in automatic or manual mode by collecting external input data (GPM satellite data, MODIS satellite imagery, AWS data) when the preprocessing and drought analysis algorithms of the satellite image storage and management server are executed; wherein in the automatic mode, the system periodically monitors the GPM satellite imagery path specified in the system settings and, when satellite data is generated in the server folder, performs drought analysis automatically; wherein the drought analysis results are stored in a year/month/day format in the [Drought Analysis Result Path] specified by the user based on the analysis time (date/time) information, and additional information regarding the analysis results is stored in [System Settings]-[Drought Analysis Result Storage DB].

3. A drought analysis method using satellite imagery of claim 1, wherein external input data (GPM satellite data, MODIS satellite imagery, AWS data) are collected to perform drought analysis in automatic or manual mode when the preprocessing and drought analysis algorithms of the satellite image storage and management server are executed; wherein in the manual mode, drought analysis is performed based on the GPM satellite imagery path and the analysis time point (year/month/day) selected by the user, and the result is stored in the [Drought Analysis Result Path]; wherein the drought analysis result is not stored in the [Drought Analysis Result Storage DB].

4. A drought analysis method using satellite imagery of claim 1, wherein the drought analysis algorithm equipped in the satellite image storage and management server is MATLAB-based, utilizing MATLAB Runtime Compiler such as MCR for system operation, and DB Engine for database access along with Microsoft redistributable package for program execution.

5. A drought analysis method using satellite imagery of claim 1, wherein the input satellite imagery includes MODIS satellite imagery directly received from artificial satellites and GPM satellite data received online, wherein the MODIS satellite imagery comprises MOD11A2 satellite data for land surface temperature (LST) and emissivity of MODIS (Aqua/Terra) satellites, and MOD13A2 satellite data for normalized difference vegetation index (NDVI) of MODIS (Aqua/Terra) satellites, and the GPM satellite data comprises precipitation data of GPM satellites.

6. A drought analysis method using satellite imagery of claim 5, wherein the directly received MODIS satellite imagery is stored in the satellite data storage of the satellite image storage and management server, and during automatic analysis, monitors the files in this storage through a polling method, automatically executing the analysis program when new satellite image data is received, storing the results, and registering the information into a catalog database.

7. A drought analysis method using satellite imagery of claim 1, wherein the ground observation data are collected online from Automatic Weather Stations (AWS) servers, representing daily average temperature/humidity data over a certain period in the past, based on the analysis time point.

8. A drought analysis method using satellite imagery of claim 1, wherein the MODIS satellite imagery undergoes preprocessing stages of Level 0 (Raw Instrument Packets), Level 1A (Scans of raw radiances in counts), and Level 1B (Calibrated Radiances) on the image processing server before being transmitted to the satellite image storage and management server, thereby obtaining images that are distinguished between water bodies and non-water bodies when outputted.

9. A drought analysis method using satellite imagery of claim 1, wherein layers are published to a GIS engine, Geoserver, for effective data management and visualization of water surface analysis results, and functionality is provided to overlay administrative boundary lines (provinces, cities/counties, districts) by default, and watershed-level common watershed maps, including major river basins, intermediate river basins, and standard watershed boundaries, can be optionally overlaid according to user selection.

10. A drought analysis method using satellite imagery of claim 1, wherein monitoring of the reservoir volume based on the water surface area calculated from the MODIS satellite imagery is performed temporally, enabling calculation of an average and a standard deviation of the water surface area and the reservoir volume to allow for accurate analysis of drought and flood occurrence possibilities in medium and small reservoirs.

* * * * *